US009021108B2

(12) United States Patent
Brown et al.

(10) Patent No.: US 9,021,108 B2
(45) Date of Patent: Apr. 28, 2015

(54) METHOD, SYSTEM AND APPARATUS FOR ENABLING ACCESS OF A FIRST MOBILE ELECTRONIC DEVICE TO AT LEAST ONE NETWORK ACCESSIBLE BY A SECOND MOBILE ELECTRONIC DEVICE

(75) Inventors: David Andrew Brown, Waterloo (CA); Herbert Anthony Little, Waterloo (CA); Marcel Luis Celaya, Victoria (CA)

(73) Assignee: Blackberry Limited, Waterloo, Ontario (CA)

(*) Notice: Subject to any disclaimer, the term of this patent is extended or adjusted under 35 U.S.C. 154(b) by 120 days.

(21) Appl. No.: 13/034,796

(22) Filed: Feb. 25, 2011

(65) Prior Publication Data

US 2012/0079123 A1 Mar. 29, 2012

Related U.S. Application Data

(60) Provisional application No. 61/386,716, filed on Sep. 27, 2010.

(51) Int. Cl.
| | |
|---|---|
| *G06F 15/16* | (2006.01) |
| *G06F 15/173* | (2006.01) |
| *H04W 8/20* | (2009.01) |
| *H04M 1/725* | (2006.01) |
| *H04W 24/02* | (2009.01) |
| *H04W 48/16* | (2009.01) |

(Continued)

(52) U.S. Cl.
CPC .............. *H04W 8/20* (2013.01); *H04M 1/7253* (2013.01); *H04W 24/02* (2013.01); *H04W 48/16* (2013.01); *H04W 48/20* (2013.01); *H04W 74/00* (2013.01)

(58) Field of Classification Search
USPC .................................. 709/228; 455/41.1, 41.2
See application file for complete search history.

(56) References Cited

U.S. PATENT DOCUMENTS

| 5,909,183 A | 6/1999 | Borgstahl et al. |
|---|---|---|
| 6,167,408 A | 12/2000 | Cannon et al. |
| 6,747,598 B2 * | 6/2004 | Bajikar .................... 342/357.51 |

(Continued)

FOREIGN PATENT DOCUMENTS

| EP | 1793531 A1 * | 6/2007 |
|---|---|---|
| WO | 2009/089208 A1 | 7/2009 |

OTHER PUBLICATIONS

Alkar, A.Z. "An Internet Based Wireless Home Automation System for Multifunctional Devices," IEEE Transactions on Consumer Electronics, vol. 51, Issue 4, Nov. 2005, pp. 1169-1174.*

(Continued)

*Primary Examiner* — Melvin H Pollack
(74) *Attorney, Agent, or Firm* — Perry + Currier, Inc.

(57) ABSTRACT

A method, system and apparatus for or automatically enabling access of a first mobile electronic device to at least one network accessible by a second mobile electronic device, the second mobile electronic device storing configuration data for accessing the at least one network. A communication session is automatically established between the first mobile electronic device and the second mobile electronic device via a local link. The configuration data is automatically received at the first mobile electronic device from the second mobile electronic device via the local link in response to establishing the communication session. The configuration data is automatically installed at the first mobile electronic device such that the at least one network is accessible by the first mobile electronic device using the configuration data.

23 Claims, 5 Drawing Sheets

(51) Int. Cl.
*H04W 48/20* (2009.01)
*H04W 74/00* (2009.01)

(56) References Cited

U.S. PATENT DOCUMENTS

| | | | |
|---|---|---|---|
| 7,058,181 B2 | 6/2006 | Wright et al. | |
| 7,565,107 B2* | 7/2009 | Komatsuzaki et al. | 455/41.1 |
| 7,610,055 B2 | 10/2009 | Erhart et al. | |
| 7,680,281 B2* | 3/2010 | Fiatal et al. | 380/255 |
| 7,764,639 B2 | 7/2010 | Perrot et al. | |
| 8,116,679 B2* | 2/2012 | Dunko | 455/41.1 |
| 8,134,954 B2* | 3/2012 | Godfrey et al. | 370/328 |
| 8,140,650 B2* | 3/2012 | Pulkkinen et al. | 709/220 |
| 8,169,945 B2* | 5/2012 | Sheriff et al. | 370/315 |
| 8,185,601 B2* | 5/2012 | Rauhala et al. | 709/216 |
| 8,250,186 B2* | 8/2012 | Wang et al. | 709/221 |
| 8,281,015 B2* | 10/2012 | Jia et al. | 709/227 |
| 8,316,116 B2* | 11/2012 | Hamilton et al. | 709/221 |
| 8,554,244 B2* | 10/2013 | I'Anson et al. | 455/456.1 |
| 8,700,739 B2* | 4/2014 | Khedouri et al. | 709/219 |
| 8,713,132 B2* | 4/2014 | Baum et al. | 709/218 |
| 8,713,630 B2* | 4/2014 | Raleigh | 726/1 |
| 8,730,842 B2* | 5/2014 | Collins et al. | 370/255 |
| 8,745,167 B2* | 6/2014 | Mendez et al. | 709/219 |
| 2002/0055924 A1* | 5/2002 | Liming | 707/100 |
| 2002/0147027 A1* | 10/2002 | Alford et al. | 455/557 |
| 2004/0073915 A1 | 4/2004 | Dureau | |
| 2005/0272371 A1 | 12/2005 | Komatsuzaki et al. | |
| 2006/0067290 A1 | 3/2006 | Miwa et al. | |
| 2006/0120518 A1 | 6/2006 | Baudino et al. | |
| 2007/0153732 A1 | 7/2007 | Yao | |
| 2007/0197237 A1 | 8/2007 | Powell et al. | |
| 2008/0075034 A1 | 3/2008 | Hsieh | |
| 2008/0076454 A1 | 3/2008 | Yeh | |
| 2008/0119136 A1* | 5/2008 | Khazi | 455/41.2 |
| 2008/0205417 A1 | 8/2008 | Li | |
| 2010/0068997 A1 | 3/2010 | Dunko | |
| 2010/0110921 A1 | 5/2010 | Famolari et al. | |
| 2011/0296154 A1* | 12/2011 | Chien | 713/2 |
| 2012/0210404 A1 | 8/2012 | Patil et al. | |
| 2012/0213216 A1* | 8/2012 | Chen et al. | 370/338 |
| 2012/0317224 A1* | 12/2012 | Caldwell et al. | 709/217 |

OTHER PUBLICATIONS

Richard, G.G. "Service Advertisement and Discovery: Enabling Universal Device Cooperation," IEEE Internet Computing, vol. 4, Issue 5, Sep./Oct. 2000, pp. 18-26.*
Blue Tooth File Transfer V.3 Source: http://www.gsmupload.com/bluetooth-file-transfer-v3-30/ Downloaded from the Internet on Nov. 11, 2010.
Bump Source: http://bu.mp/faq Downloaded from the Internet on Nov. 11, 2010.
PayPal and Bump Source—http://www.readwriteweb.com/archives/paypal_on_android_lets_you_bump_phones_to_send_money.php Downloaded from the internet on Nov. 11, 2010.
Wifi Profile Viewer Source—http://www.redsand.net/projects/WifiProfileViewer/WifiProfileViewer.php Downloaded from the Internet on Nov. 11, 2010.
Windows Xp Source—http://technet.microsoft.com/en-ca/library/bb878069.aspx Downloaded from the Internet on Nov. 11, 2010.
Nintendo Wifi Source: http://powet.tv/powetblog/2006/05/29/keep-your-friend-codes-despite-buying-a-new-ds/ Downloaded from the Internet on Nov. 11, 2010.
European Patent Application No. 11 17 7998.9 Search Report dated Jan. 20, 2012.
Related PCT Application No. PCT/US2012/048961 International Search Report dated Jan. 8, 2013.
Related PCT Application No. PCT/US2012/048961 Written Opinion dated Jan. 8, 2013.
Corresponding Canadian Patent Application No. 2749497 Examination Report dated Mar. 6, 2014.
Counterpart Canadian Patent Application No. 2749497, "Examination Report" dated Feb. 24, 2015.

* cited by examiner

METHOD, SYSTEM AND APPARATUS FOR ENABLING ACCESS OF A FIRST MOBILE ELECTRONIC DEVICE TO AT LEAST ONE NETWORK ACCESSIBLE BY A SECOND MOBILE ELECTRONIC DEVICE

CROSS-REFERENCE TO RELATED APPLICATIONS

The present application claims priority from U.S. Provisional Patent Application No. 61/386,716 filed on Sep. 27, 2010, the contents being incorporated herein by reference.

FIELD

The specification relates generally to mobile electronic devices, and specifically to a method, system and apparatus for enabling automatic access of a first mobile electronic device to at least one network accessible by a second mobile electronic device.

BACKGROUND

Transitioning from one mobile electronic device to another mobile electronic device can be time consuming data for accessing networks, for example via access points such as WiFi access points, needs to be manually entered into the new device.

BRIEF DESCRIPTIONS OF THE DRAWINGS

Embodiments are described with reference to the following figures, in which.

DETAILED DESCRIPTION OF THE EMBODIMENTS

An aspect of the present specification provides a method for automatically enabling access of a first mobile electronic device to at least one network accessible by a second mobile electronic device, the second mobile electronic device storing configuration data for accessing the at least one network, the method comprising: automatically establishing a communication session between the first mobile electronic device and the second mobile electronic device via a local link receiving the configuration data at the first mobile electronic device from the second mobile electronic device via the local link in response to establishing the communication session; and automatically installing the configuration data at the first mobile electronic device such that the at least one network is accessible by the first mobile electronic device using the configuration data.

The configuration data can be received at the first mobile electronic device in response to automatically transmitting a request for the configuration data from the first mobile electronic device to the second mobile electronic device, the request transmitted when the communication session is established.

The configuration data can be received at the first mobile electronic device in an automatic push of the configuration data from the second mobile electronic device to the first mobile electronic device, the push occurring when the communication session is established.

The local link can comprise a cable connecting the first mobile electronic device and the second mobile electronic device.

The local link can comprises a near field communication network. The near field communication network can comprise a Bluetooth® link between the first mobile electronic device and the second mobile electronic device.

The configuration data can comprise data for connecting to the at least one network via at least one WiFi access point. The configuration data can comprise at least one WiFi profile.

The configuration data can comprise at least one of a WiFi profile, a WiMax profile, an identifier of a network access point, a network identifier, SSID (Service Set Identifier) data, wireless type data, passwords, access data, encryption data, encryption keys, decryption keys, WEP (Wired Equivalent Privacy) keys, certification data, certificates, address information.

The method can further comprise the first wireless electronic device connecting to the at least one network using the configuration data.

Another aspect of the specification provides a mobile electronic device for automatically providing access of the mobile electronic device to at least one network accessible by a second mobile electronic device, the second mobile electronic device storing configuration data for accessing the at least one network. The mobile electronic device comprises a processing unit interconnected with a communication interface, the processing unit enabled to: automatically establish a communication session between the mobile electronic device and the second mobile electronic device via a local link through said communication interface; receive the configuration data from the second mobile electronic device via the local link in response to establishing the communication session; and automatically install the configuration data at the mobile electronic device such that the at least one network is accessible by the mobile electronic device using the configuration data.

The configuration data can be received at the mobile electronic device in response to automatically transmitting a request for the configuration data from the mobile electronic device to the second mobile electronic device, the request transmitted when the communication session is established.

The configuration data can be received at the mobile electronic device in an automatic push of the configuration data from the second mobile electronic device to the mobile electronic device, the push occurring when the communication session is established.

The local link can comprise a cable connecting the mobile electronic device and the second mobile electronic device.

The local link can comprise a near field communication network. The near field communication network can comprise a Bluetooth® link between the mobile electronic device and the second mobile electronic device.

The configuration data can comprise data for connecting to the at least one network via at least one WiFi access point. The configuration data can comprise at least one WiFi profile.

The configuration data can comprise at least one of a WiFi profile, a WiMax profile, an identifier of a network access point, a network identifier, SSID (Service Set Identifier) data, wireless type data, passwords, access data, encryption data, encryption keys, decryption keys, WEP (Wired Equivalent Privacy) keys, certification data, certificates, address information.

A further aspect of the specification provides a method for automatically enabling access of a first mobile electronic device to at least one network accessible to a second mobile electronic device, the second mobile electronic device storing configuration data for accessing the at least one network, the method comprising: automatically establishing a communication session between the first mobile electronic device and the second mobile electronic device via a local link; automatically transmitting the configuration data to the first mobile electronic via the local link in response to establishing the communication session, the configuration data for automatic installation at the first mobile electronic device such that the at least one network is accessible by the first mobile electronic device using the configuration data.

Yet a further aspect of the specification provides a mobile electronic device for automatically providing access of a second mobile electronic device to at least one network accessible by the mobile electronic device. The mobile electronic device comprises a processing unit interconnected with a communication interface and a memory storing configuration data for accessing the at least one network, the processing unit enabled to: automatically establish a communication session between the mobile electronic device and the second mobile electronic device via a local link through the communication interface; automatically transmit the configuration data to the second mobile electronic device via the local link in response to establishing the communication session, the configuration data for automatic installation at the second mobile electronic device such that the at least one network is accessible by the second mobile electronic device using the configuration data.

A further aspect of the specification provides a computer program product, comprising a computer usable medium having a computer readable program code adapted to be executed to implement a method for automatically enabling access of a first mobile electronic device to at least one network accessible by a second mobile electronic device, the second mobile electronic device storing configuration data for accessing the at least one network, the method comprising: automatically establishing a communication session between the first mobile electronic device and the second mobile electronic device via a local link; receiving the configuration data at the first mobile electronic device from the second mobile electronic device via the local link in response to establishing the communication session; and automatically installing the configuration data at the first mobile electronic device such that the at least one network is accessible by the first mobile electronic device using the configuration data.

Yet a further aspect of the specification provides a computer program product, comprising a computer usable medium having a computer readable program code adapted to be executed to implement a method for automatically enabling access of a first mobile electronic device to at least one network accessible to a second mobile electronic device, the second mobile electronic device storing configuration data for accessing the at least one network, the method comprising: automatically establishing a communication session between the first mobile electronic device and the second mobile electronic device via a local link; transmitting the configuration data to the first mobile electronic device via the local link in response to establishing the communication session, the configuration data for automatic installation at the first mobile electronic device such that the at least one network is accessible by the first mobile electronic device using the configuration data.

Figure 1:
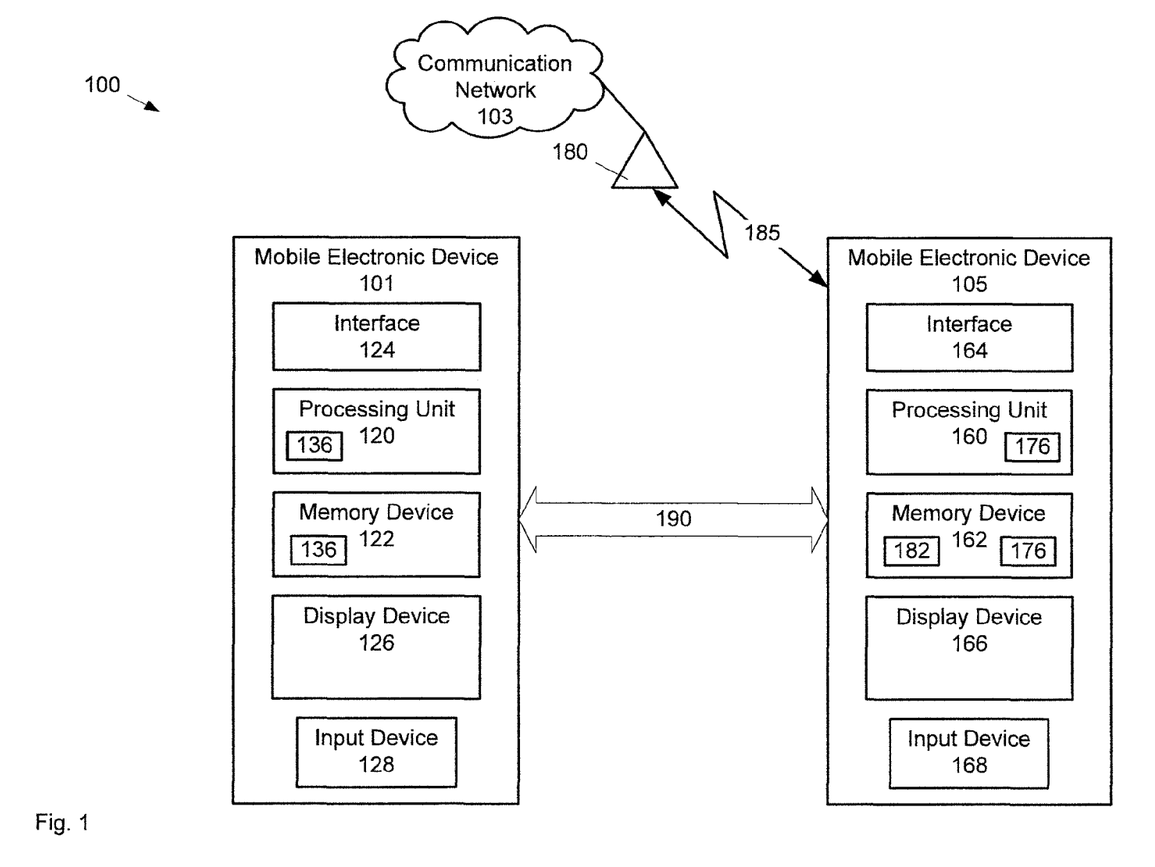
FIG. 1 depicts a system for enabling access of a first mobile electronic device to at least one communication network accessible by a second mobile electronic, according to non-limiting implementations.

FIG. 1 depicts a system 100 for enabling access of a first mobile electronic device 101 to at least one communication network 103 accessible by a second mobile electronic 105, according to non-limiting implementations. First mobile electronic device 101 will also be referred to hereafter as device 101, and second mobile electronic device 105, will also be referred to hereafter as device 105. Device 101 comprises a processing unit 120 interconnected with a memory device 122, a communication interface 124, a display device 126 and an input device 128, for example via a computing bus (not depicted). Memory device 122, communication interface 124, and display device 126 will also be referred to hereafter as, respectively, memory 122, interface 124 and display 126. Device 101 further comprises an application 136 for managing data received from second mobile electronic device 105, as will be explained below. Application 136 can be stored in memory 122 and processed by processing unit 120.

Similarly device 105 comprises a processing unit 160 interconnected with a memory device 162, a communication interface 164, a display device 166 and an input device 168, for example via a computing bus (not depicted). Memory device 162, communication interface 164, and display device 166 will also be referred to hereafter as, respectively, memory 162, interface 164, and display 166. Device 105 further comprises an application 176 for managing requests received from device 101, as will be explained below. Application 176 can be stored in memory 162 and processed by processing unit 160.

In any event, device 105 is enabled to access communication network 103, which will also be referred to hereafter as network 103, via a wireless access point 180 in communication with network 103. In particular device 105 comprises at least one set of configuration data 182 (also referred to hereafter as data 182), stored in memory 162. Configuration data 182 enables device 105 to communicate wirelessly with access point 180 via interface 164, as represented by wireless link 185 in FIG. 1. For example, network 103 can comprise the Internet or any other suitable combination of wired and wireless networks. Access point 180 can comprise any suitable wireless access point to network 103, including but not limited to a WiFi access point, a WiMax access point, or the like. Data 182 can comprise any suitable data for establishing setting up link 185 such that communications with access point 180 can occur; data 182 can hence include, but is not limited to: a WiFi profile, a WiMax profile, an identifier of access point 180, a network identifier, SSID (Service Set Identifier) data, wireless type data, passwords, access data, encryption data, encryption keys, decryption keys, WEP (Wired Equivalent Privacy) keys, certification data, certificates, address information and the like. In some implementations, access point 180 can comprise a WiFi access point and hence data 182 comprise any suitable data for communicating with a WiFi access point.

It is appreciated that, initially, while device 105 can access network 103 via access point 180, device 101 is unable to access network 103 as device 101 has not been configured to communicate with access point 180.

It is further appreciated that device 101 can be paired with device 105 such that a local link 190 between device 101 and device 105 can be established. For example, local link 190 can comprise any suitable near field communication (NFC) network. The near field communication network can include, but is not limited to, a Bluetooth® connection between device 101 and device 105. However other suitable near field communication network are within the scope of present implementations.

It is further appreciated that local link 190 can include any suitable combination of wired and/or wireless links. For example, local link 190 can comprise a suitable cable.

It is yet further appreciated that device 101 and device 105 can each be associated with the same user (not depicted), and hence it can be desired that each of devices 101, 105 be enabled to communicate with the same wireless access points, such as access point 180.

In some implementations, device 105 is smaller than device 101. For example, device 105 can comprise a PDA and device 101 can comprise a tablet computing device. It is appreciated that in these implementations, device 105 can be an "unconscious carry" in that device 105 can be easily carried, unconsciously, on the person of a user, for example in holster on belt, in a pocket, handbag or the like. In contrast, device 101 can be a "conscious carry" as conscious effort must be put into transporting device 101. For example device 101 cannot be easily carried on the person of user and is transported by hand, in a backpack, briefcase, or the like (i.e. a carrying device larger than a carrying device used to transport device 105). In other words, the mobility of device 105 is greater than the mobility of device 101. Hence device 105 more likely to encounter new access points and thus device 105 is more likely to be configured to communicate with more access points to communicate with more networks (or have more access to the same network) than device 101. It is nonetheless desirable to enable device 105 to access the same network(s) accessible by device 105 as device 101 can be brought (e.g. at a later time) to the same geographic locations as access points accessible by device 105.

For example, assume that a user owns a PDA (e.g. device 105) and tablet computing device (e.g. device 101). The user is more likely to carry the PDA around and access the Internet using available WiFi connections, for example at a business location, an employer location, a client location, a coffee shop or the like. At each location, the PDA is manually enabled to access a local WiFi connection and the configuration data (e.g. WiFi profiles) for accessing the WiFi connection is stored at the PDA for later access to the same WiFi connection (e.g. as data 182). At a later date, the user may transport the tablet computing device to the same location(s), and the same WiFi connections are then to be accessed using the tablet computing device. Inconveniently, the tablet computing device must then be manually enabled to access the same WiFi connections accessible to the PDA. This is inconvenient, inefficient and a waste of computing resources at the tablet computing device.

In general, device 101 comprises any suitable mobile electronic device for processing application 136, including but not limited to any suitable combination of portable electronic devices, mobile computing device, portable computing devices, tablet computing devices, laptop computing devices, PDAs (personal digital assistants), cellphones, smartphones and the like. Other suitable portable electronic devices are within the scope of present implementations.

Similarly, device 105 comprises any suitable mobile electronic device for processing application 176, including but not limited to any suitable combination of portable electronic devices, mobile computing device, portable computing devices, tablet computing devices, laptop computing devices, PDAs (personal digital assistants), cellphones, smartphones and the like. Other suitable portable electronic devices are within the scope of present implementations.

Processing unit 120 comprises any suitable processor, or combination of processors, including but not limited to a microprocessor, a central processing unit (CPU) and the like. Other suitable processing units are within the scope of present implementations.

Memory 122 can comprise any suitable memory device, including but not limited to any suitable one of, or combination of, volatile memory, non-volatile memory, random access memory (RAM), read-only memory (ROM), hard drive, optical drive, flash memory, magnetic computer storage devices (e.g. hard disks, floppy disks, and magnetic tape), optical discs, and the like. Other suitable memory devices are within the scope of present implementations. In particular, memory 122 is enabled to store application 136 and a copy of data 182, as will be described below.

Communication interface 124 comprises any suitable communication interface, or combination of communication interfaces. In particular interface 124 is enabled to communicate wirelessly with network 103 via access point 180. Accordingly, interface 124 is enabled to communicate according to any suitable protocol which is compatible with the network, including but not limited to wireless protocols, cell-phone protocols, wireless data protocols, WiFi protocols, WiMax protocols and/or a combination, or the like. However, as described above, initially device 101 is lacking suitable data for communicating with network 103 via access point 180.

Further, interface 124 is enabled to communicate with interface 164 at device 105 using any suitable combination of NFC (near field communication) protocols, Bluetooth® protocols, or the like. In some implementations, interface 124 can be enabled to communicate with remote computing devices (e.g. servers, other computing devices, other mobile electronic devices, etc.), via any suitable communication network according to any suitable protocol, including but not limited to packet based protocols, Internet protocols, analog protocols, PSTN (public switched telephone network) protocols, WiFi protocols, WiMax protocols and the like, and/or a combination. Other suitable communication interfaces and/or protocols are within the scope of present implementations.

Input device 128 is generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Display 126 comprises any suitable one of or combination of CRT (cathode ray tube) and/or flat panel displays (e.g. LCD (liquid crystal display), plasma, OLED (organic light emitting diode), capacitive or resistive touchscreens, and the like).

Processing unit 160, memory 162, interface 164, display 166 and input device 168 can be substantially similar to, respectively, processing unit 120 memory 122, interface 124, display 126 and input device 128 as described above. In particular, memory 162 is enabled to store application 176 and data 182. Further, interface 164 is enabled to communicate with network 103 via access point 180 by processing data 192 using any suitable combination described above with reference to interface 124. Further interface 164 is enabled to communicate with interface 124 at device 101 using any suitable NFC protocol, as described above with reference to interface 124, including but not limited to Bluetooth® protocols.

Figure 2:
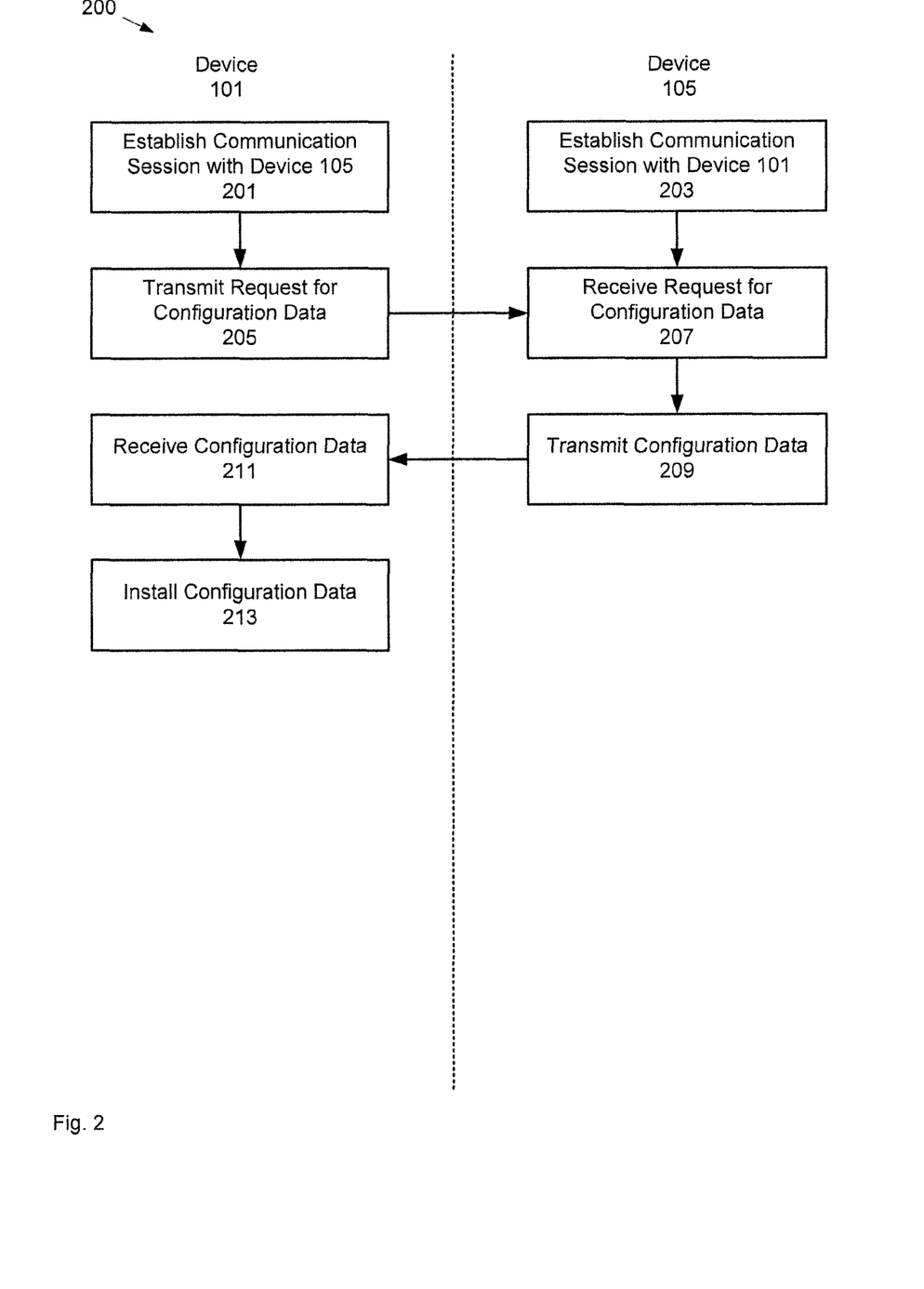
FIG. 2 depicts a method for enabling access of a first mobile electronic device to at least one communication network accessible by a second mobile electronic, according to non-limiting implementations.

Attention is now directed to FIG. 2 which depicts a method 200 for enabling access of a first mobile electronic device to at least one network accessible by a second mobile electronic device. In order to assist in the explanation of method 200, it will be assumed that method 200 is performed using system 100. Furthermore, the following discussion of method 200 will lead to a further understanding of system 100 and its various components. However, it is to be understood that system 100 and/or method 200 can be varied, and need not work exactly as discussed herein in conjunction with each other, and that such variations are within the scope of present embodiments.

It is appreciated that method 200 is implemented in system 100 by processing units 120, 160 of devices 101, 105, respectively. Further, it is appreciated that devices 101, 105 can implement respective aspects of method 200: the respective aspects performed by each device 101, 105 are indicated in FIG. 2 with aspects performed by device 101 under the heading "Device 101", and aspects performed by device 105 under the heading "Device 105". It is further appreciated that the respective aspects of method 200 performed by devices 101, 105 are implemented by each device 101, 105 processing applications 136, 176, respectively, each of which can run in the background on the associated respective devices 101, 105.

At 201 and 203, a communication session between device 101 and device 105 is established via local link 190 using, for example, a suitable cable or near field communication such as Bluetooth®. Hence, the communication session comprises a near field communication session. However, it appreciated that the method of establishing communication via local link 190 is generally considered non-limiting. Further it is appreciated that 201 and 203 can occur automatically and/or manually whenever devices 101, 105 are in proximity to one another. It is hence further appreciated that the first time devices 101, 105 are in proximity, NFC data can be exchanged there between (not depicted) for setting up a first communication session there between and stored at each device 101, 105. Such NFC data can be used by devices 101, 105 to establish the communication session on local link 190 (and/or to establish local link 190). It is appreciated that establishing local link 190 can occur independent of applications 136, 176.

Figure 3:
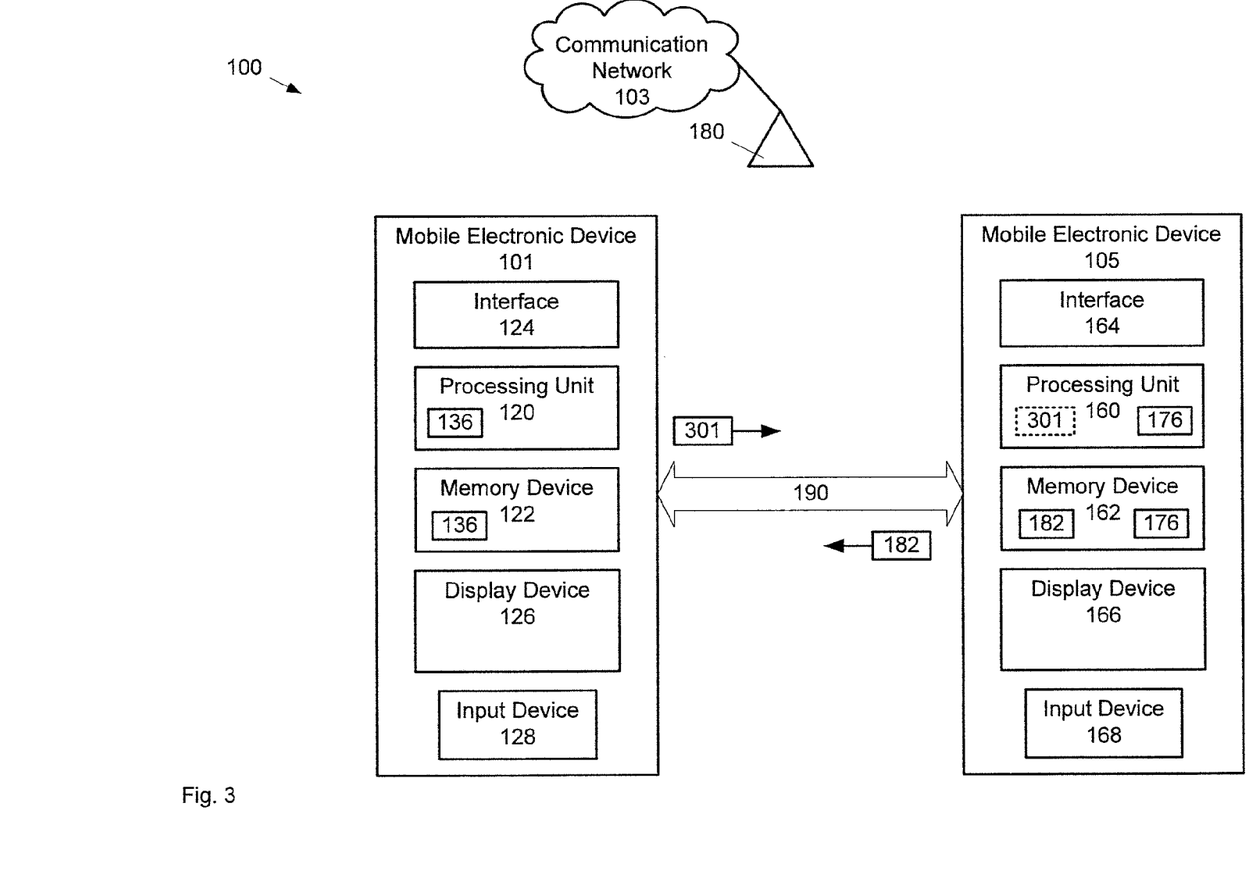
FIG. 3 depicts transfer of configuration data to the first mobile electronic device in the system of FIG. 1, according to non-limiting implementations.

At 205, device 101 transmits a request 301 for configuration data 182 to device 105, for example when the communication session and/or local link 190 is established. In other words, device 101 is requesting data for enabling communication with any access points and/or access to communication networks accessible by device 105. In alternative implementations, transmission of request 301 can be triggered periodically and/or by suitable actuation of input device 128. The transmission of request 301 from device 101 to device 105 is depicted in FIG. 3, which is substantially similar to FIG. 1 with like elements having like numbers. It is appreciated, however, that in FIG. 3, device 105 is not in communication with access point 180; indeed, whether or not device 105 is in communication with access point 180 is substantially non-limiting.

In any event, request 301 is transmitted via local link 190 in the established communication session. Then, returning to FIG. 2, at 207, request 301 is received at device 105. Request 301 is processed by device 105 and, at 209, device 105 responds by transmitting data 182 to device 101 in the communication session via local link 190. Data 182 can be transmitted in any suitable format, for example as raw data and/or packaged and/or formatted for transmission in the communication session and/or local link 190.

At 211, data 192 is received at device 101 in the communication session.

As an alternative to 201 to 207, device 105 can push configuration data 182 to device 101, when local link 190 is established, and/or periodically or the like.

Figure 4:
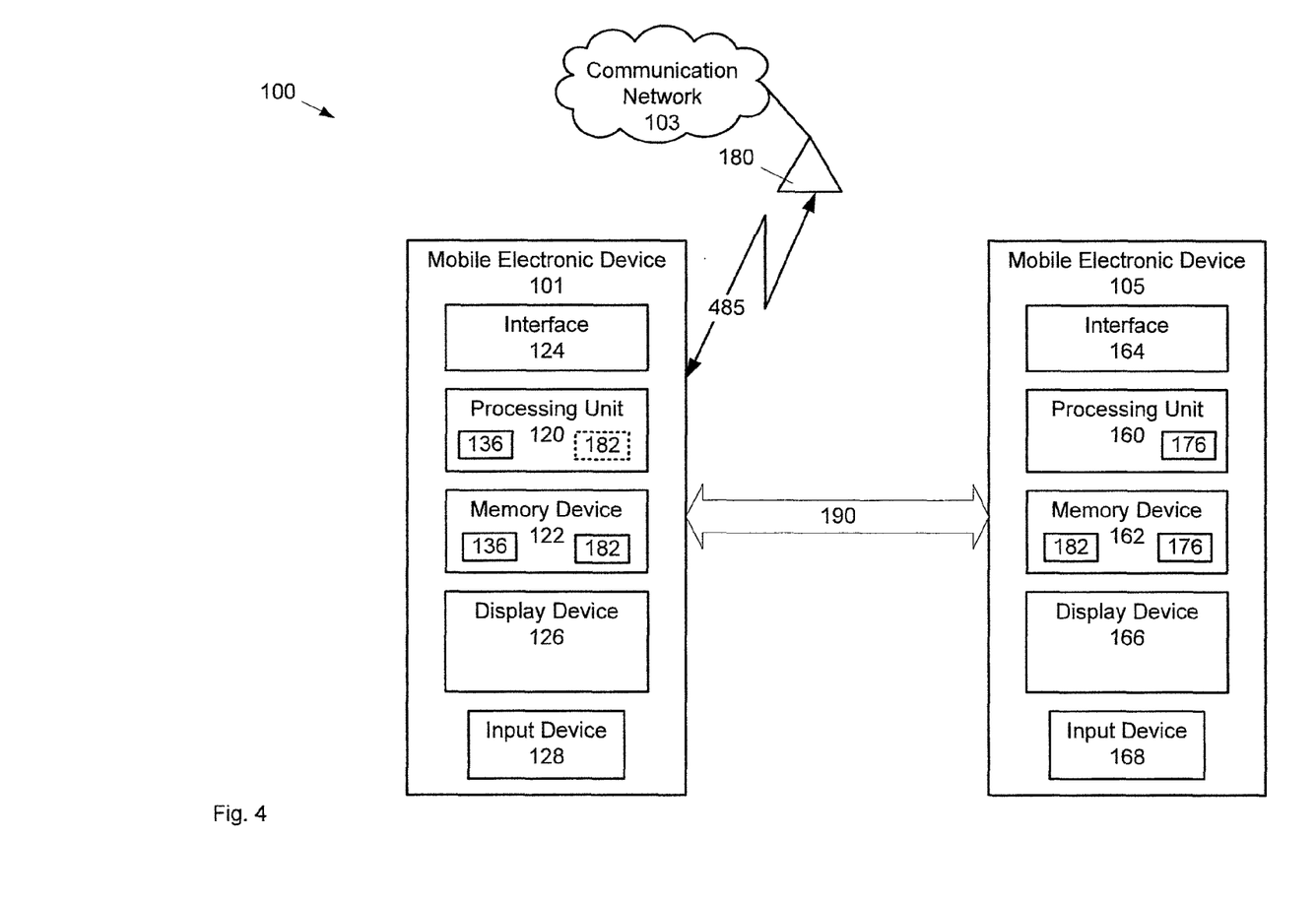
FIG. 4 depicts the first mobile electronic device of the system of FIG. 1 accessing a communication network using configuration data received from the second mobile electronic device, according to non-limiting implementations.
Figure 5:
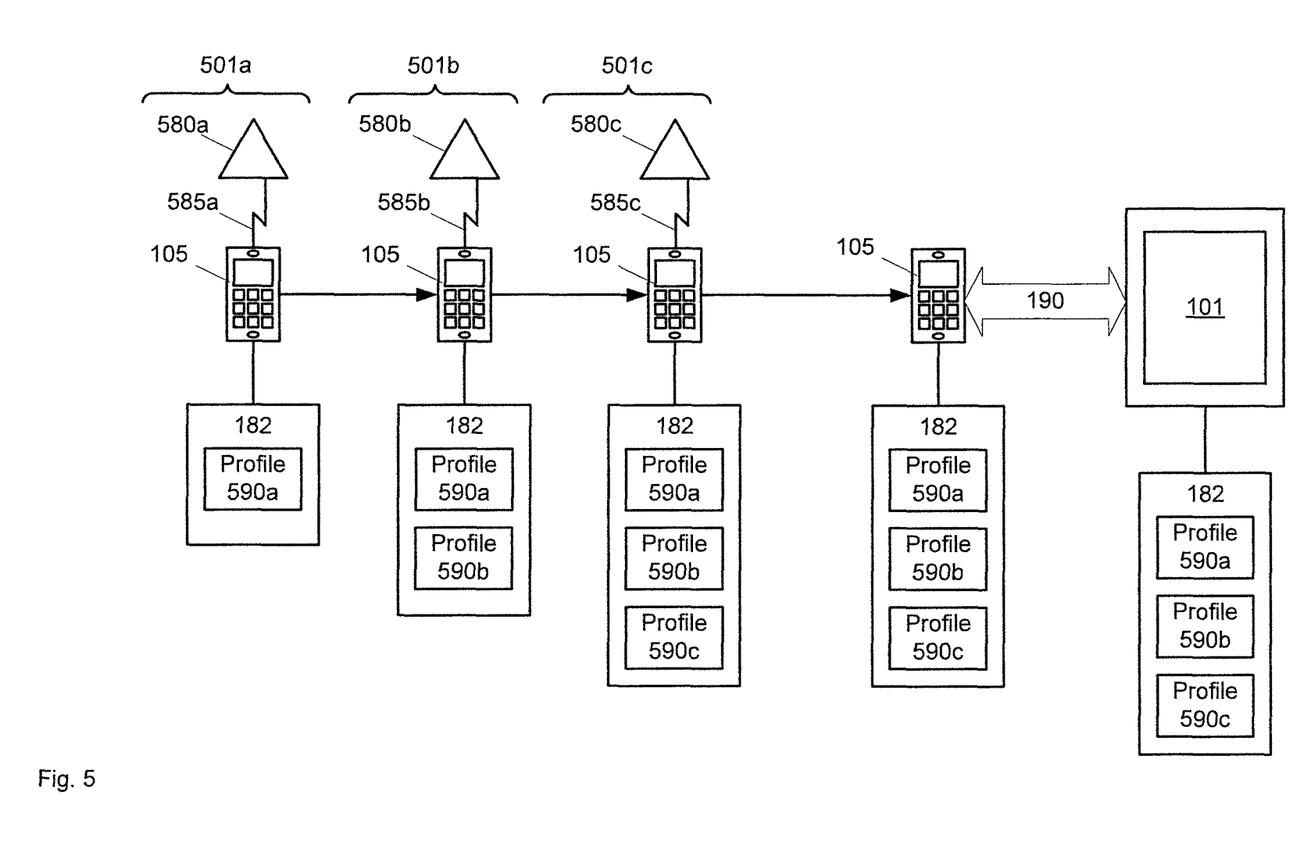
FIG. 5 depicts the acquisition of configuration data at a plurality of locations by the second mobile electronic device for later transmittal to first mobile electronic device, according to non-limiting implementations.

At 213, and as depicted in FIG. 4 (substantially similar to FIG. 3, with like elements having like numbers) data 182 is installed at device 101. For example, data 182 can be processed by processing unit 120 and stored at memory 122. Once data 182 is installed at device 101, device 101 can subsequently access network 180 via access point 180 using data 182, as further depicted in FIG. 4 by establishing a wireless link 485 with access point 180.

In some implementations request 301 can comprise an AJAX (asynchronous JavaScript and XML) request. In further implementations device 101 can be running a QNX operating system and data 182 can be placed in a PPS (persistent publish subscribe) framework in the QNX operating system.

With reference to FIG. 4 it is appreciated that device 105 can be transported to a plurality of locations 501a, 501b, 501c (generically a location 501 and collectively locations 501) each comprising a respective access point 580a, 580b, 580c (generically an access point 580 and collectively access points 580). Each of access points 580 can be similar to access point 180 described above. At each location 501, device 105 can acquire a respective profile 590a, 590b, 590c (generically a profile 590 and collectively profiles 590) for establishing a respective link 585a, 585b, 585c with a respective access point 580a, 580b, 580c in order to access a network or networks (not depicted) at each location 501. Data 182, described above, can comprise profile data 590 and each profile 590 can include, but is not limited to a WiFi profile, a WiMax profile, a network identifier, SSID (Service Set Identifier) data, wireless type data, passwords, access data, encryption data, encryption keys, decryption keys, WEP (Wired Equivalent Privacy) keys, certification data, certificates, and address information.

For example, in implementations depicted in FIG. 4, device 105 is first transported to location 501 where device 105 acquires profile 590a to establish link 585a with access point 580a. Device 105 is then transported to location 501b where device 105 acquires profile 590b to establish link 585b with access point 580b. Device 105 is then transported to location 501c where device 105 acquires profile 590c to establish link 585c with access point 580c. While three locations 501 (with respective access points 580) are depicted in FIG. 4, and three profiles 590 are acquired at device 105 (e.g. in data 182), it is appreciated that the number of locations and number of profiles 590 are generally non-limiting, and that device 105 can acquire any suitable number of profiles 590.

In any event, eventually device 105 comes into proximity with device 101 such that local link 190 is established. Data 182, comprising profiles 590, is thus transmitted from device 105 to device 101, such that each device 101, 105 has a copy of data 182. Data 182, comprising profiles 590, are thus installed at device 101 and device 101 can thereafter establish links with access points 580 to access respective networks, when transported to respective locations 501, without having to acquire each respective profile 590 at each location 501.

Hence, by acquiring configuration data 182 (e.g. profiles 590) for access points 580 at device 105, and transferring a copy of the configuration data 182 to device 101 when a near field communication session is established between device 101 and device 105, device 101 can thereafter establish respective links 585 with respective access points 580. This obviates a need to locally install configuration data 182 for each access point 580 at device 101 saving processing resources and general wear and tear on device 101. In other words, only one automatic installation of configuration data 182 occurs rather than a plurality of (possibly manual) installations, one for each access point 580.

It is further appreciated that, in some implementations, device 105 can keep track of which profiles 590 have already been transmitted to device 101. Hence, in subsequent local communication sessions with device 105, only profiles 590 which have been acquired since the last local communication session are transmitted to device 105 (i.e. a delta of data 182 is transmitted to device 105).

It is yet further appreciated that, in some implementations, the exchange of data 182 can be bi-directional. In other words, device 101 can acquire profiles 590 that have not been acquired by device 101 and can transmit these profiles 590 to device 101 via local link 190.

Thus, when device 101 and device 105 are paired and, for example, associated with the same user, each of device 101 and device 105 can then be enabled to access the same networks via the same access points based on configuration data acquired by each device 101, 105. Therefore, whether the user is transporting one or both of devices 101, 105 to a previously visited location at which a link 585 was established with an access point 580 using one of the two devices 101, 105, the other of the two devices 101, 105 can also then establish a link 585 with the same access point 580.

Those skilled in the art will appreciate that in some embodiments, the functionality of devices 101, 105 can be implemented using pre-programmed hardware or firmware elements (e.g., application specific integrated circuits (ASICs), electrically erasable programmable read-only memories (EEPROMs), etc.), or other related components. In other embodiments, the functionality of devices 101, 105 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method for automatically enabling access of a first mobile electronic device to at least one network accessible by a second mobile electronic device, said second mobile electronic device storing configuration data for accessing said at least one network, said method comprising:
　automatically establishing a communication session between said first mobile electronic device and said second mobile electronic device via a local link, wherein said automatically establishing said communication session occurs without one or more of a manual communication and a manual input of respective identifiers of said first mobile electronic device and said second mobile electronic device;
　automatically receiving said configuration data at said first mobile electronic device from said second mobile electronic device via said local link in response to establishing said communication session, said configuration data comprising a plurality of profiles for accessing a plurality of respective access points; and
　automatically installing said configuration data at said first mobile electronic device such that said at least one network is accessible by said first mobile electronic device using said configuration data, wherein at least said automatically receiving and said automatically installing occur rather than a manual installation of said configuration data at said first mobile electronic device, and said automatically installing occurs for all of said plurality of said profiles at once rather than a plurality of installations for each of said plurality of profiles.

2. The method of claim 1, wherein said configuration data is received at said first mobile electronic device in response to automatically transmitting a request for said configuration data from said first mobile electronic device to said second mobile electronic device, said request transmitted when said communication session is established.

3. The method of claim 1, wherein said configuration data is received at said first mobile electronic device in an automatic push of said configuration data from said second mobile electronic device to said first mobile electronic device, said push occurring when said communication session is established.

4. The method of claim 1, wherein said local link comprises a cable connecting said first mobile electronic device and said second mobile electronic device.

5. The method of claim 1, wherein said local link comprises a near field communication network.

6. The method of claim 5, wherein said near field communication network comprises a Bluetooth® link between said first mobile electronic device and said second mobile electronic device.

7. The method of claim 1, wherein said configuration data comprises data for connecting to said at least one network via at least one WiFi access point.

8. The method of claim 7, wherein said configuration data comprises at least one WiFi profile.

9. The method of claim 1, wherein said configuration data comprises at least one of a WiFi profile, a WiMax profile, an identifier of a network access point, a network identifier, SSID (Service Set Identifier) data, wireless type data, passwords, access data, encryption data, encryption keys, decryption keys, WEP (Wired Equivalent Privacy) keys, certification data, certificates, address information.

10. The method of claim 1, further comprising said first wireless electronic device connecting to said at least one network using said configuration data.

11. A mobile electronic device for automatically providing access of the mobile electronic device to at least one network accessible by a second mobile electronic device, said second mobile electronic device storing configuration data for accessing said at least one network, comprising:

a processing unit interconnected with a communication interface, said processing unit enabled to:
automatically establish a communication session between said mobile electronic device and said second mobile electronic device via a local link through said communication interface, wherein said automatically establishing said communication session occurs without one or more of a manual communication and a manual input of an identifier of said mobile electronic device and said second mobile electronic device;
automatically receive said configuration data from said second mobile electronic device via said local link in response to establishing said communication session, said configuration data comprising a plurality of profiles for accessing a plurality of respective access points; and
automatically install said configuration data at said mobile electronic device such that said at least one network is accessible by said mobile electronic device using said configuration data, wherein at least said automatically receive and said automatically install occur rather than a manual installation of said configuration data at said mobile electronic device, and automatically installation of said configuration data occurs for all of said plurality of said profiles at once rather than a plurality of installations for each of said plurality of profiles.

12. The mobile electronic device of claim 11, wherein said configuration data is received at said mobile electronic device in response to automatically transmitting a request for said configuration data from said mobile electronic device to said second mobile electronic device, said request transmitted when said communication session is established.

13. The mobile electronic device of claim 11, wherein said configuration data is received at said mobile electronic device in an automatic push of said configuration data from said second mobile electronic device to said mobile electronic device, said push occurring when said communication session is established.

14. The mobile electronic device of claim 11, wherein said local link comprises a cable connecting said mobile electronic device and said second mobile electronic device.

15. The mobile electronic device of claim 11, wherein said local link comprises a near field communication network.

16. The mobile electronic device of claim 15, wherein said near field communication network comprises a Bluetooth® link between said mobile electronic device and said second mobile electronic device.

17. The mobile electronic device of claim 11, wherein said configuration data comprises data for connecting to said at least one network via at least one WiFi access point.

18. The mobile electronic device of claim 17, wherein said configuration data comprises at least one WiFi profile.

19. The mobile electronic device of claim 11, wherein said configuration data comprises at least one of a WiFi profile, a WiMax profile, an identifier of a network access point, a network identifier, SSID (Service Set Identifier) data, wireless type data, passwords, access data, encryption data, encryption keys, decryption keys, WEP (Wired Equivalent Privacy) keys, certification data, certificates, address information.

20. A method for automatically enabling access of a first mobile electronic device to at least one network accessible to a second mobile electronic device, said second mobile electronic device storing configuration data for accessing said at least one network, said method comprising:
automatically establishing a communication session between said first mobile electronic device and said second mobile electronic device via a local link, wherein said automatically establishing said communication session occurs without one or more of a manual communication and a manual input of respective identifiers of said first mobile electronic device and said second mobile electronic device;
automatically transmitting said configuration data to said first mobile electronic device via said local link in response to establishing said communication session, said configuration data comprising a plurality of profiles for accessing a plurality of respective access points, said configuration data for automatic installation at said first mobile electronic device such that said at least one network is accessible by said first mobile electronic device using said configuration data, wherein at least said automatically transmitting and said automatic installation occurs rather than a manual installation of said configuration data at said first mobile electronic device, and said automatic installation occurs for all of said plurality of said profiles at once rather than a plurality of installations for each of said plurality of profiles.

21. A mobile electronic device for automatically providing access of a second mobile electronic device to at least one network accessible by the mobile electronic device, comprising:
a processing unit interconnected with a communication interface and a memory storing configuration data for accessing said at least one network, said processing unit enabled to:
automatically establish a communication session between said mobile electronic device and said second mobile electronic device via a local link through said communication interface, wherein said automatically establishing said communication session occurs without one or more of a manual communication and a manual input of respective identifiers of said mobile electronic device and said second mobile electronic device;
automatically transmit said configuration data to said second mobile electronic device via said local link in response to establishing said communication session, said configuration data comprising a plurality of profiles for accessing a plurality of respective access points, said configuration data for automatic installation at said second mobile electronic device such that said at least one network is accessible by said second mobile electronic device using said configuration data, wherein at least said automatic transmit and said automatic installation occurs rather than a manual installation of said configuration data at said second mobile electronic device, and said automatic installation occurs for all of said plurality of said profiles at once rather than a plurality of installations for each of said plurality of profiles.

22. A computer program product, comprising a computer usable medium having a computer readable program code adapted to be executed to implement a method for automatically enabling access of a first mobile electronic device to at least one network accessible by a second mobile electronic device, said second mobile electronic device storing configuration data for accessing said at least one network, said method comprising:
automatically establishing a communication session between said first mobile electronic device and said second mobile electronic device via a local link, wherein said automatically establishing said communication session occurs without one or more of a manual communication and a manual input of respective identifiers of said first mobile electronic device and said second mobile electronic device;

automatically receiving said configuration data at said first mobile electronic device from said second mobile electronic device via said local link in response to establishing said communication session, said configuration data comprising a plurality of profiles for accessing a plurality of respective access points; and automatically installing said configuration data at said first mobile electronic device such that said at least one network is accessible by said first mobile electronic device using said configuration data, wherein at least said automatically receiving and said automatically installing occur rather than a manual installation of said configuration data at said first mobile electronic device, and said automatically installing occurs for all of said plurality of said profiles at once rather than a plurality of installations for each of said plurality of profiles.

23. A computer program product, comprising a computer usable medium having a computer readable program code adapted to be executed to implement a method for automatically enabling access of a first mobile electronic device to at least one network accessible to a second mobile electronic device, said second mobile electronic device storing configuration data for accessing said at least one network, said method comprising:

automatically establishing a communication session between said first mobile electronic device and said second mobile electronic device via a local link, wherein said automatically establishing said communication session occurs without one or more of a manual communication and a manual input of respective identifiers of said mobile electronic device and said second mobile electronic device;

automatically transmitting said configuration data to said first mobile electronic device via said local link in response to establishing said communication session, said configuration data comprising a plurality of profiles for accessing a plurality of respective access points, said configuration data for automatic installation at said first mobile electronic device such that said at least one network is accessible by said first mobile electronic device using said configuration data, wherein at least said automatically transmitting and said automatic installation occurs rather than a manual installation of said configuration data at said first mobile electronic device, and said automatic installation occurs for all of said plurality of said profiles at once rather than a plurality of installations for each of said plurality of profiles.

* * * * *

UNITED STATES PATENT AND TRADEMARK OFFICE
CERTIFICATE OF CORRECTION

| | | |
|---|---|---|
| PATENT NO. | : 9,021,108 B2 | Page 1 of 1 |
| APPLICATION NO. | : 13/034796 | |
| DATED | : April 28, 2015 | |
| INVENTOR(S) | : David Andrew Brown et al. | |

It is certified that error appears in the above-identified patent and that said Letters Patent is hereby corrected as shown below:

In the Claims

Column 11, line 25, Claim 11, "automatically" should read --automatic--.

Signed and Sealed this
Twenty-fourth Day of November, 2015

Michelle K. Lee
*Director of the United States Patent and Trademark Office*